Jan. 6, 1925. 1,522,355
B. F. WINTERHOFF
ELECTRIC GASOLINE GAUGE
Filed Feb. 28, 1922 3 Sheets-Sheet 1
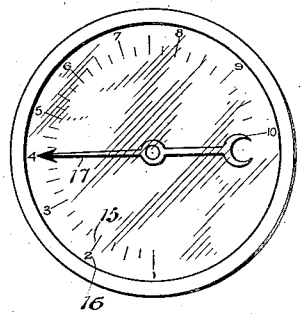
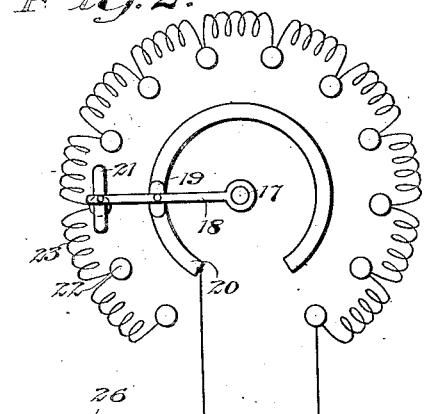
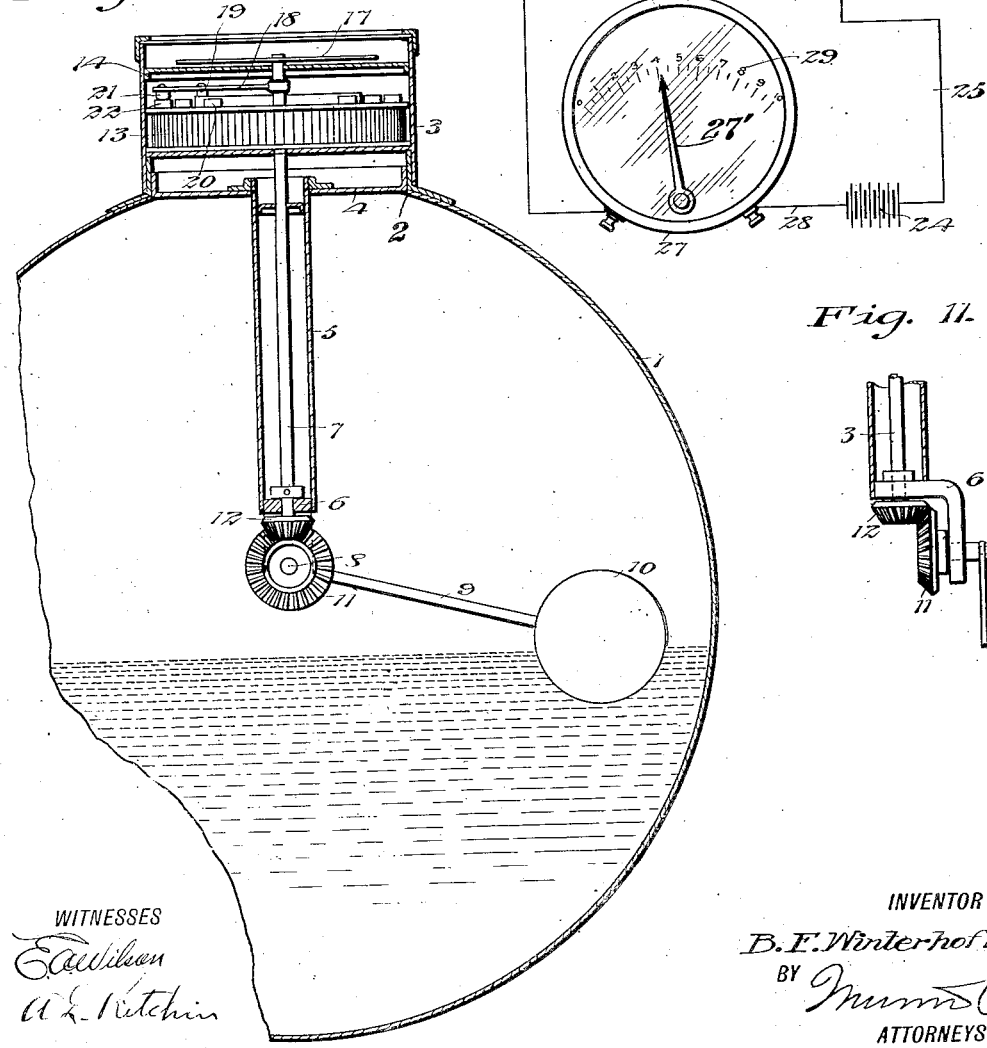
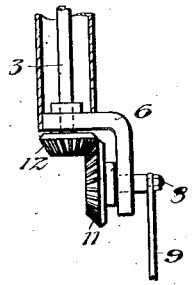
INVENTOR
B. F. Winterhoff
BY
ATTORNEYS
WITNESSES

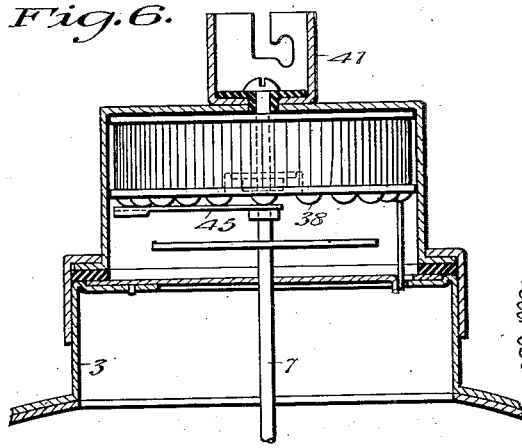
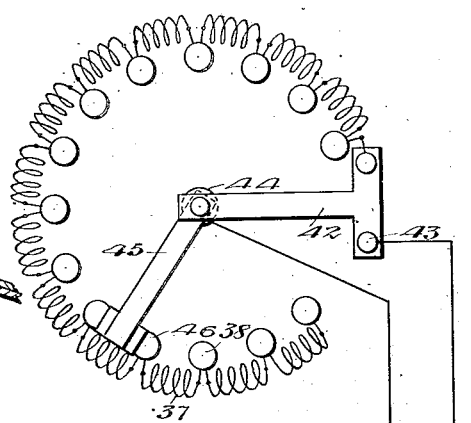
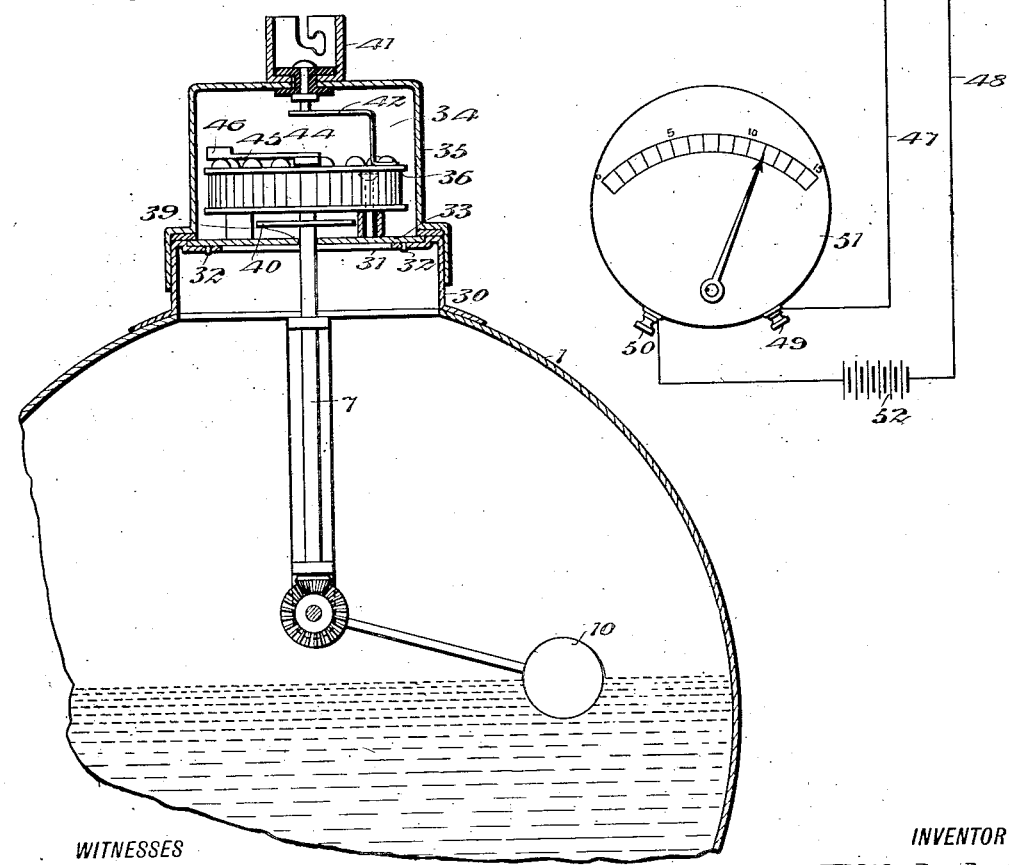

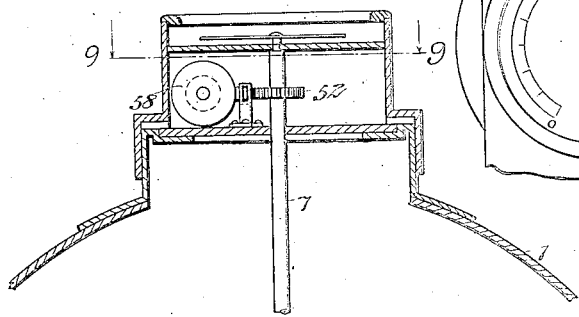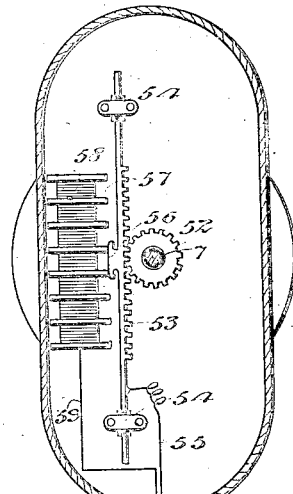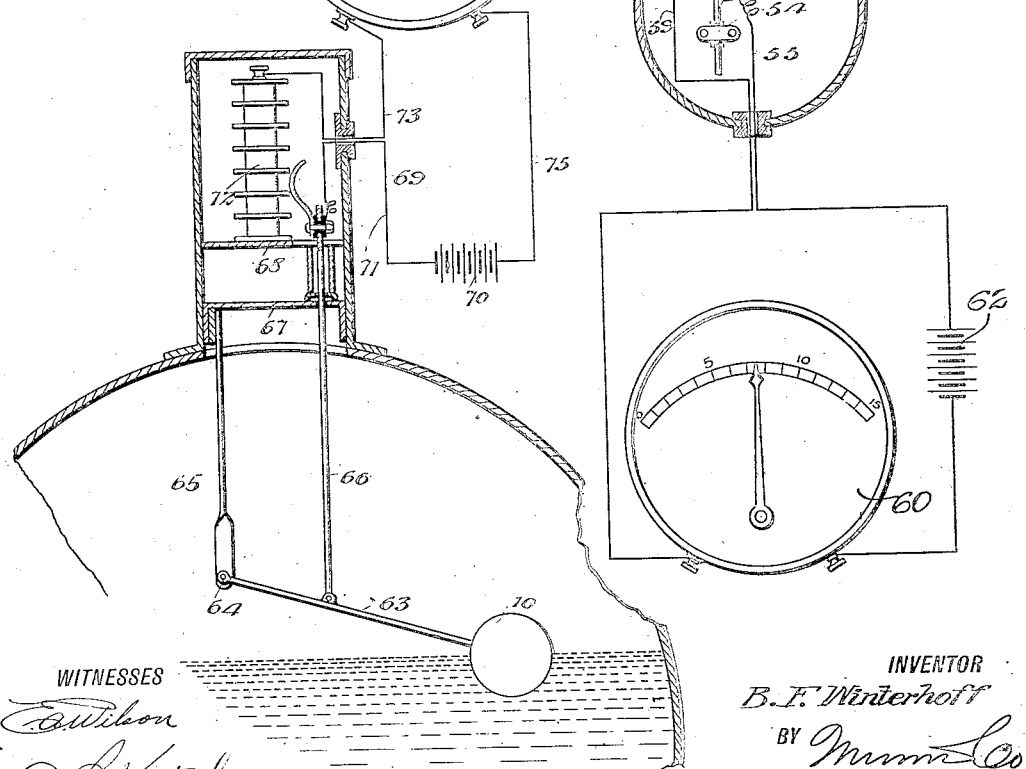

Patented Jan. 6, 1925.

1,522,355

UNITED STATES PATENT OFFICE.

BENJAMIN F. WINTERHOFF, OF ELKHART, INDIANA.

ELECTRIC GASOLINE GAUGE.

Application filed February 28, 1922. Serial No. 540,070.

*To all whom it may concern:*

Be it known that I, BENJAMIN F. WINTERHOFF, a citizen of the United States, and a resident of Elkhart, in the county of Elkhart and State of Indiana, have invented a new and Improved Electric Gasoline Gauge, of which the following is a full, clear, and exact description.

This invention relates to gauges for tanks and particularly to an improved gauge for gasoline tanks used on automobiles and other places wherein means are presented which will not only show the level of gasoline at a point near the tank but also give the same information at a point distant from the tank.

Another object in view is to provide a gauge for gasoline tanks for automobiles or other gasoline tanks for other purposes which has an electric connection operable as the gasoline level varies, the arrangement being such that the indicator may be positioned at any desired point regardless of the location of the tank.

A still further object of the invention is to provide an electrically operated indicating gauge for gasoline tanks wherein the dial may be arranged at any point and a rheostat is arranged to be operated by a float in the tank so as to vary the electrical action controlling the indications on the dial.

In the accompanying drawings—

Figure 1 is a fragmentary sectional view through a tank and a gauge disclosing one embodiment of the invention.

Figure 2 is a diagram showing a rheostat structure in connection with an electrically operated instrument of the volt-meter type.

Figure 3 is a fragmentary top plan view of the structure shown in Figure 1.

Figure 4 is a view similar to Figure 1 but showing a modified structure.

Figure 5 is a view similar to Figure 2 but showing the wiring and other features illustrated in Figure 4.

Figure 6 is a fragmentary view similar to Figure 4 but showing a slight modified structure.

Figure 7 is a view similar to Figure 6 but showing a different form of mechanism designed to accomplish the same result.

Figure 8 is a top plan view of the structure shown in Figure 7.

Figure 9 is a horizontal sectional view through Figure 7 on line 9—9.

Figure 10 is a sectional view similar to Figure 1 but showing a modified structure thereof, said figure including a diagram for illustrating how the electrically operated indicating member may be located at a distant point.

Figure 11 is a detail fragmentary side view of the gear supporting bracket and associated parts shown in Figure 1.

In the accompanying drawings, a number of modified constructions have been shown but they all embody the same principle of providing a rheostat operated by a float and connected with some form of indicating means for indicating the level of the gasoline in a given tank. This structure may be used in stationary tanks or wherever desired though it is particularly adapted for use in connection with automobiles.

In Figures 1, 2 and 3 is seen a preferred structure wherein 1 indicates a tank of any desired shape and size. This tank is provided with an opening 2 over which a casing 3 is positioned. This casing is provided with a bottom plate 4 in which a tube 5 is screwed or otherwise secured, said tube carrying a bracket 6 at the lower end which bracket guides the shaft 7 and also the stub shaft 8. An arm 9 is connected to the stub shaft 8, said arm carrying a float 10. A bevel gear 11 is also secured to the stub shaft 8 and meshes with a pinion 12 secured rigidly to shaft 7 which shaft extends longitudinally of tube 5 and through a block of insulating material 13 as well as through the top dial plate 14. This dial plate is provided with graduations 15 having suitable legends 16 over which the pointer 17 passes. The pointer 17 is rigidly secured to shaft 7 and in addition a switch arm 18 is rigidly secured to shaft 7, said switch arm being secured to the shaft between the block 13 and plate 14.

Arm 18 carries an inner contact 19 adapted to continually contact with the contact plate 20 which is almost a circle and which, if desired, may be a complete circle. The arm 18 also carries a comparatively long contact member 21 which is adapted to always engage one of the contact posts 22 whereby there will be no sparking as the contact 21 moves over the various posts 22. Between the posts 22 is arranged any suitable resistance 23 so that as the arm 18 moves to the right as shown in Figure 2, the resistance will be gradually cut out. Current from a suitable source 24 is provided, said source being connected through wire 25 to the last contact post 22 while a wire 26 is connected to the contact plate 20 and also to an instrument 27. The wire 28 is connected to the source 24 and also to the instrument 27 whereby whenever there is current flowing from the source 24, it will pass through the instrument 27 for effecting the pointer 27' and cause the same to move to a certain extent over the graduations 29. This instrument may be any suitable form of magnetic instrument as for instance an ordinary voltmeter with the graduations 29 arranged to indicate gallons. It will be understood, of course, that these graduations must be properly calibrated in respect to the contact post 22, the float 10 and associated parts.

When the level of liquid in the tank 1 moves downwardly, the float 10 will consequently move downwardly and will cause a rotation of arm 18 toward the left as shown in Figure 2. As the parts are shown in the drawing, the pointer 27' will gradually move over toward the indication zero as the level of liquid in the tank becomes lower and lower. When the tank is filled the float will rise and the pointer 27' will gradually move back to the indication 10 indicating that the tank is full.

In Figures 4 and 5 will be seen a modified structure in which a permanent member or open ended cap 30 is connected to the tank 1 and is provided with a large opening 31 as well as with small openings for receiving the pins 32 carried by the splash plate 33. This plate prevents the splashing of liquid into the compartment 34 formed by the removable cap 35 which may be fastened in place in any suitable manner, as for instance, by merely tightly fitting over part of the cap 30. In this form of the invention a suitable frame or housing 36 is provided for carrying the different resistance coils 37 which coils are connected to the respective contact heads 38. These heads are all arranged above the frame or housing 36 and consequently will be out of the way of any possible splashing of liquid through the opening 39, which opening accommodates the shaft 7. An auxiliary splash plate 40 is provided though ordinarily this is not necessary. The cap 35 carries an ordinary electric socket 41 of any suitable kind, said socket having one side engaging the contact bracket 42 which is secured to the binding post 43 while the opposite contact is connected in any suitable manner with the pivotal point or pin 44 carrying the contact arm 45. This arm carries a contact brush or plate 46 adapted to remain in engagement with one of the heads 38 at all times whereby sparking is eliminated as the voltage in the device is usually very low. Any suitable electric plug may be fitted into the socket 41 for forming a connection and when so fitted the wires 47 and 48 in the plug are designed to extend to the posts 49 and 50 of the indicating instrument 51, a suitable source of current 52 being interposed in one of these wires. The instrument 51 may be any suitable magnetically operated mechanism, as for instance, a volt-meter with suitable calibrations and legends to agree with the rheostat formed by the coils 37 and associated parts shown in Figure 5. This member 51 as well as the member 27, shown in Figure 2, may be located at a convenient point on an automobile where a device is used on such a vehicle or may be located wherever it is desired where the device is used in connection with other devices.

In the preferred structure shown in Figure 1, means are provided for indicating at a distance the level of gasoline in tank 1 and also means are provided for indicating at the tank the level of liquid therein.

In Figure 6 a slightly modified form is shown to that illustrated in Figure 4 wherein the arm 45 is arranged beneath the various resistance coils 37 and is arranged to press upwardly against the various contact heads 38.

In Figures 7, 8 and 9 an additional modification of the invention is shown wherein the shaft 7 carries a gear wheel 52 meshing with a rack 53 and acts to move the rack longitudinally when operated. This rack is slidingly mounted in brackets 54, which brackets are insulated from the surrounding parts. The gear wheel 52 is also insulated from the shaft 7 so that current passing from wire 55 onto one of the supports 54 will electrically charge the rack 53. This rack is provided with a contact shoe 56 adapted to engage the various contacts 57 connected with the coils 58. These coils and contacts form a rheostat connected to wire 59 whereby as the shoe 56 slides along the contacts more or less resistance is inserted. The wires 55 and 59 extend to an instrument 60 similar to instrument 51 while a suitable source of current 62 is interposed in wire 55. In this form of the invention the power from the shaft 7 is utilized for changing the resistance in the circuit of the indicating instrument 60 and thereby causing a proper actuation thereof for truly indicating the condition of the liquid in the tank 1.

In Figure 10 a further modified form of the invention is seen in which the float 10 is connected with an arm 63 pivotally mounted at 64 onto a depending bracket 65. A link 66 is pivotally connected to arm 63 and slidingly extends through a plate 67 as well as a suitable opening in plate 68. A contact shoe 69 is carried by the arm 66 but insulated therefrom, said contact plate being also connected to the source of current 70 by wire 71. A rheostat 72 similar to the rheostat shown in Figure 9 is carried by the plate 68 and is connected with the wire 73 which wire in turn is connected to the instrument 74 which instrument is similar to the instruments 27, 51 and 60. A wire or conductor 75 connects the source of current 70 and instrument 74 for completing the circuit. This construction provides a direct operation of the shoe 69 in connection with the rheostat 72 instead of through a rotating arm or through the rack and gear shown in Figure 9.

What I claim is:—

1. In an electric indicator, the combination of a casing, a circular row of spaced contacts arranged within the casing, resistance elements connecting said contacts, a substantially annular contact member arranged within said circular row of contacts, a lead connected to one end of the circular row of contacts, a pivotally mounted arm for traversing simultaneously said circular row of spaced contacts and said substantially annular contact member, an independent wiping contact shoe on the said arm for said circular row of contacts and said substantially annular contact member respectively for engaging respectively said circular row of contacts and said substantially annular contact member, a second lead connected to said substantially annular contact member, and means for moving said arm on its pivotal support.

2. In an electric indicator, the combination of a substantially annular contact member, a series of contact posts arranged in the arc of a circle of larger diameter than said contact member, a resistance element connecting said contact posts, a lead connected to one of the end contact posts, a second lead connected to said substantially annular contact member, an elongated shoe co-operating with said post and always in engagement with one of the posts, a second shoe co-operating with said contact member, means for electrically and mechanically connecting said shoes, a shaft for moving said means, and means for actuating said shaft.

3. In an electric indicator, the combination of a casing, a circular row of spaced contacts arranged within the casing, resistance elements connecting said contacts, a second contact element arranged within said circular row of spaced contacts, a lead connected to one end of the circular row of contacts, a pivotally mounted arm for traversing simultaneously said circular row of spaced contacts and said inner contact, an independent wiping shoe on said arm for said circular row of contacts and for said inner contact, a second lead connected to said inner contact, a rod adapted to extend into a tank secured to said arm, a float arranged in said tank, and bevel gears for transmitting power from said float to said rod.

4. In an electric indicator, the combination of a rheostat having a swinging arm, a shaft adapted to extend into a tank and rigidly secured to said arm, a bevel gear connected with said shaft, a second bevel gear meshing with the first mentioned bevel gear, an arm secured to said second mentioned bevel gear and a float connected with said arm, said float being adapted to be acted on by the liquid in the tank whereby said bevel gears are rotated as the liquid moves upwardly or downwardly and consequently power is transmitted to said first mentioned arm for varying the action of the rheostat.

BENJAMIN F. WINTERHOFF.